July 26, 1955    S. DANBY, JR., ET AL    2,713,698
WET POLYMER EXTRUDER
Filed June 28, 1951
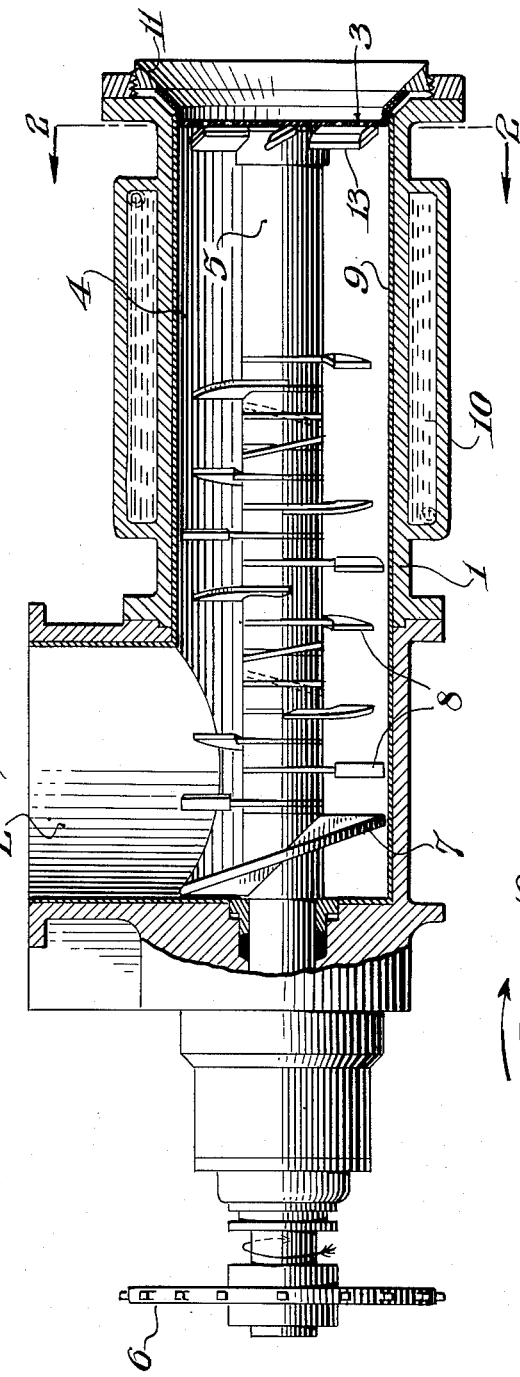
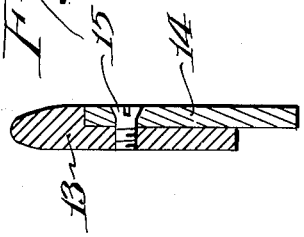
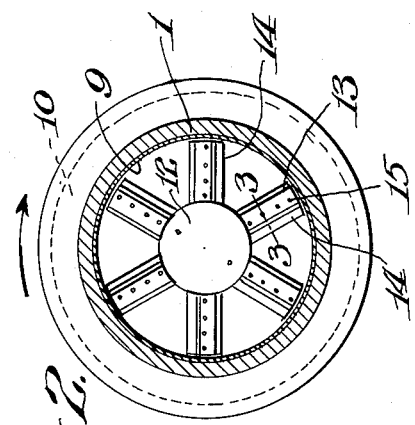
INVENTORS:
Spencer Danby, Jr.,
James Henderson Ellett,
Algernon Protheroe Guess
and Thurman Virgil Williams, Jr.
BY
C. W. Mortenson
ATTORNEY.

2,713,698

WET POLYMER EXTRUDER

Spencer Danby, Jr., James H. Ellett, Algernon P. Guess, and Thurman V. Williams, Jr., Camden, S. C., assignors to E. I. du Pont de Nemours & Company, Wilmington, Del., a corporation of Delaware Application June 28, 1951, Serial No. 234,076

3 Claims. (Cl. 18—12)

This invention relates to improved apparatus for extruding a wet polymer in solid form preparatory to drying the same on a perforated belt.

The development of continuous processes for the production of wet polymers has lead to the use of a continuous perforated belt-type dryer. In this type dryer, the wet polymer is distributed across the full width of the belt, and conveyed through the heated zone usually with forced circulation of heated air which passes through the belt. The discharged material must be dry and undegraded. For best dryer efficiency, the belt load must be distributed evenly so that a uniform pressure drop exists across the belt to prevent free passage of heated air through open areas. In the case of heat sensitive materials, such as polymers, this factor is even more critical, since uneven loading may lead to an uneven dryness and to product which is degraded by overheating. In order to form a bed wherein each particle of product is exposed substantially to the same amount of heating and also to achieve a practicable pressure drop across the bed, it is common practice to form the wet product into small particles which lie loosely on the belt and provide the necessary porosity.

In one type of extruder the wet polymer is advanced by an auger through a barrel to the die plate which is provided with a large number of uniform perforations, preferably circular. With a polymer such as polyacrylonitrile, the wet filter cake is relatively non-homogeneous consisting of small superficial agglomerates of polyacrylonitrile particles. Each particle of polymer contains water absorbed into its pores, and additional water is contained between particles in the larger agglomerates. While a material exhibiting plastic flow will transmit compressive force in a manner similar to a fluid, the wet polyacrylonitrile under compression is subject to change in structure. The water held by the porosity of the agglomerates is forced out as a free phase, leaving the de-watered particles in a hard non-fluid condition. It is not possible to extrude de-watered polyacrylonitrile and when a very small amount of this polymer collects on the die plate, the extruder output recedes rapidly to an impractically low value.

It is therefore an object of this invention to provide a means for extruding wet polymer through a die plate without substantial separation of the water from the polymer. It is a further object to produce uniform particles of wet polymer that can be dried quickly and uniformly. Other objects will be apparent from the description that follows.

The objects of this invention are accomplished by fitting to the extrusion end of the auger shaft a plurality of wiper blades which contact or substantially contact the inner surface of the die plate as will be more fully discussed hereinafter. The blades are preferably covered with a tough, resilient, water-repellent material and Teflon (tetrafluorethylene polymer) has been found admirably suited for this purpose. Resilience is important for the blades must conform to the contour of the plate.

Figure 1 shows a longitudinal section of a suitable extruder provided with the wiper blades of this invention;

Figure 2 is taken on line 2—2 of Figure 1 and includes an end view of the shaft showing the several wiper blades attached thereto; and Figure 3 is a cross-section of a satisfactory blade showing the mounting of Teflon covering thereto, the view being taken on line 3—3 of Figure 2.

Referring to the drawings, the extruder is provided with a housing generally indicated by reference numeral 1, which has an inlet opening 2 for the introduction of the wet polymer into the cylindrical chamber 4. At the outlet end of this chamber is a die plate 3 through which the wet polymer is extruded. Centered in the cylindrical chamber of the extruder is shaft 5 journalled in suitable bearings and with suitable packing glands and provided with a drive sprocket 6. The shaft carries a short auger flight 7 and a plurality of stuffing blades 8. The cylindrical chamber 4 is provided with a stainless steel lining 9 and a water jacket 10. The die plate is held in place by means of a retainer 11.

At the extrusion end of the shaft 5 there is fastened a wiping element comprised of a central disk 12 (see Figure 2) preferably of resilient material and six stainless steel blades 13 at least partially covered with a resilient material and so mounted as to press slightly at their covered, trailing edge against the inner surface of the die plate 3. Preferably, the central disk 12 is of Teflon and the die plate contact surfaces of the blades are Teflon covered. However, this disk may be any means that limits the approach of the wipers 13 to the die plate 3. In this specific embodiment each of the six wiping blades is mounted with a 22½° feeding angle, i. e., the angle formed by the leading face of the blade and the inner surface of the die plate. The blades, thus, provide a positive metering feed of wet cake to the die plate. The trailing edges of the six blades are all in a plane perpendicular to the axis of rotation or are in slight contact throughout their length with the inner surface of the die plate.

Figures 2 and 3 illustrate how the Teflon cover 14 is fastened to the blade by means of a plurality of flat-head screws 15. Other means and other shapes and arrangements may be used. It is important, however, that the leading edge of the blades are tapered to afford a streamlined approach and that the trailing edge is adequately covered with Teflon or other resilient, water-repellent material.

The feeding angle of the blades may be changed somewhat depending on the rotational speed of the shaft and may, for example, vary from 15° to 30° with good results. Although six blades have proved very satisfactory the number of blades may be more or less depending on specific conditions and 4 or 8 or even 10 blades may be used.

Teflon is a preferred material for wiping the die plate because of its durability, resilience, toughness, and chemical inertness. It has been found to protect the die plate from damage when extraneous material such as metal or glass are accidentally dropped in the extruder. This is a significant economy since the refinishing of the die plate is a time consuming procedure. Nevertheless, other die plate contacting materials may be used with fair success as for example, polychloroprene or polyethylene. There must actually be a wiping contact between the wiper blades and the die plate and an expendable material is needed. Non-expendable materials, such as stainless steel, cannot be used. Clearances must be avoided and this is accomplished by using resilient materials such as the above mentioned polymers.

Successful extrusion of wet polyacrylonitrile polymer has been attained by this invention as is evidenced by uninterrupted operation of from 300 to 400 hours whereas the unmodified extruder was incapable of operating more than 5 or 6 hours without trouble. At the end of this short time throughput was noticeably reduced; free water appeared outside the die plate; high temperature was noted at the die plate; and the motor was seriously overloaded. Furthermore, when the Teflon wipers become badly worn and wiping contact is no longer possible, the symptom of failure is forewarned by receding capacity but without motor overloading. In many cases, the wipers are capable of further use after a shutdown. Normally, after compacted polymer has been removed from the die plate, the extruder is merely reassembled and satisfactory wiping contacts are again available.

By the apparatus of this invention the build-up of densely compacted non-fluid particles at the die plate is avoided. Process discontinuity previously encountered is eliminated, and the process can be run smoothly, efficiently and continuously.

Any departure from the procedure described herein which conforms to the principles of the invention is intended to be included within the scope of the claims below.

We claim:

1. In an extruder having a die plate, an auger shaft having at its extrusion end a plurality of rotating wiper blades in wiping contact relationship with said die plate, said blades being covered with a water-repellent, resilient polymeric material so that the resultant blades conform to the contour of the said plate throughout said wiping contact.

2. In an extruder having a die plate, an auger shaft having at its extrusion end a plurality of rotating wiper blades mounted at a feeding angle of about 15° to 30° and in wiping contact with said die plate, said blades being covered with a water-repellent, resilient polymeric material so that the resultant blades conform to the contour of the said plate throughout said wiping contact.

3. In an extruder having a die plate, an auger shaft having at its extrusion end a plurality of rotating wiper blades mounted at a feeding angle of about 22.5° and in wiping contact with said die plate, said blades being covered with a tetrafluorethylene polymer so that the resultant blades conform to the contour of the said plate throughout said wiping contact.

References Cited in the file of this patent

UNITED STATES PATENTS

| | | |
|---|---|---|
| 2,291,212 | Clinefelter | July 28, 1942 |
| 2,403,476 | Berry et al. | July 9, 1946 |
| 2,432,734 | Doesken | Dec. 16, 1947 |

FOREIGN PATENTS

| | | |
|---|---|---|
| 263,730 | Switzerland | Jan. 3, 1950 |